US010380620B2

(12) United States Patent
Longino

(10) Patent No.: US 10,380,620 B2
(45) Date of Patent: Aug. 13, 2019

(54) TECHNIQUES FOR ONLINE PRICE MATCH

(71) Applicant: NCR Corporation, Duluth, GA (US)

(72) Inventor: Jeffrey David Longino, Fayetteville, GA (US)

(73) Assignee: NCR Corporation, Atlanta, GA (US)

( * ) Notice: Subject to any disclaimer, the term of this patent is extended or adjusted under 35 U.S.C. 154(b) by 729 days.

(21) Appl. No.: 13/755,013

(22) Filed: Jan. 31, 2013

(65) Prior Publication Data

US 2014/0214520 A1 Jul. 31, 2014

(51) Int. Cl.
*G06Q 30/00* (2012.01)
*G06Q 30/02* (2012.01)

(52) U.S. Cl.
CPC ................................ *G06Q 30/0239* (2013.01)

(58) Field of Classification Search
CPC ....................... G06Q 30/0239; G06Q 30/0237
USPC ....................... 705/14.41, 14.42, 14.43, 14.4
See application file for complete search history.

(56) References Cited

U.S. PATENT DOCUMENTS 7,945,484 B1* 5/2011 Tam et al. .................. 705/26.41
8,874,901 B2* 10/2014 Cahill ..................... H04L 63/08 713/155
9,721,261 B2* 8/2017 Wilkes ................... G06Q 30/02
2002/0198772 A1* 12/2002 Bates et al. ..................... 705/14
2010/0280960 A1* 11/2010 Ziotopoulos ......... G06Q 20/202 705/80
2013/0066698 A1* 3/2013 Levy et al. ................ 705/14.17
2013/0275249 A1* 10/2013 McAfee et al. ............. 705/26.1
2014/0067513 A1* 3/2014 Arora ..................... G06Q 30/02 705/14.35

OTHER PUBLICATIONS

Microsoft Computer Dictionary, Fifth Edition, 2002, Microsoft Press, p. 23.*
Mind—A Brief Introduction, John R. Searle, 2004, Oxford University Press, pp. 62-67.*
What is Thought, Eric Baum, The MIT Press, 2004, pp. 33-65.*
Robotics, Science and Systems III, Wolfram Burgard, Oliver Brock, and Cyrill Stachniss, The MIT Press, 2008, pp. 41-48.*
Language and Mind, Chomsky, Oxford University Press, 2005, p. 62.*
Computing the Mind, Shimon Edelman, Oxford University Press, 2008, pp. 26-31.*
Noetics, Lawrence Krader, 2010, Peter Lang Publishing, pp. 551-553.*
Britannica Concise Encyclopedia, Encyclopedia Britannica, 2006, p. 537.*
Streetlights and Shadows, MIT Press, 2009, pp. 33-47.*

* cited by examiner

*Primary Examiner* — Matthew T Sittner
*Assistant Examiner* — Michael I Ezewoko
(74) *Attorney, Agent, or Firm* — Schwegman, Lundberg & Woessner

(57) ABSTRACT

Techniques for online price matching are provided. A consumer submits a price offer to a network-based servicer for a product or service. The price offer is directed to or resolved to a specific brick-and-mortar store. The brick-and-mortar store determines whether the price offer can be matched and when it can be matched; a coupon redeemable by the consumer at the brick-and-mortar store is communicated to the consumer. The coupon permits the consumer to acquire the product or service at the price offer provided by an online retailer to the consumer.

17 Claims, 3 Drawing Sheets

FIG. 3

TECHNIQUES FOR ONLINE PRICE MATCH

BACKGROUND

Automation for goods and services has reached record levels in society. Examples are everywhere from online banking and online retailing to a wide-range of devices and physical appliances that include computing and networking capabilities, which were just wishful dreams only a decade ago. For the most part, these advances have occurred because of breakthroughs in electronics and wireless communications, which have allowed complex processing and network connectivity to be achieved in the smallest of physical devices, such as a smart phone, wearable devices, or other handheld computing devices, for relatively small cost and effort.

These advancements have been embraced by retailers to different degrees and have rapidly transformed their business models. However, an unintended consequence to retailers has been hyper-competition on product price, which has now reached historic portions because a consumer can determine a price for a desired product with near instantaneous speed and without regard to the physical location of the consumer.

For example, Red Laser™ permits a consumer to scan a barcode of a product via his/her smartphone and receive a price comparison on the spot from a variety of online and other physical stores. Thus, retailers are becoming "show rooms" where consumers visit the physical store of a retailer to see and tryout a product but do not buy from that retailer; rather, the consumer often buys the desired product online for a far cheaper price (aka "scan and scram"). The process of using a retailer to try out and view a product is referred to as "show rooming." Many analysts believe that Best Buy® has experienced severe financial difficulties in recent years because of the increase in consumer "show rooming."

"Show rooming" is only expected to get worse for physical retail chains as consumers become more conscious about overpaying for products and as the consumers adopt smartphones and apps, such as Red Laser™ with even greater regularity.

If traditional brick-and-mortar stores do not change their business modules, pricing modules, and adopt technology, the stores are destined to become a distant nostalgic memory in society.

SUMMARY

In various embodiments, techniques for online price matching are presented. According to an embodiment, a method for online price matching is provided.

Specifically, an offer is received from a consumer. The offer tied to an online retailer and the offer directed to a price for a product or service available at a brick-and-mortar store. Next, the offer is submitted to the brick-and-mortar store for review. Finally, an acceptance is communicated to the consumer for the offer when accepted by the brick-and-mortar store; the product or server acquired by the consumer at or below the price at the brick-and-mortar store.

BRIEF DESCRIPTION OF THE DRAWINGS

FIG. 3 is a diagram of an online price matching system, according to an example embodiment.

DETAILED DESCRIPTION

Figure 1:
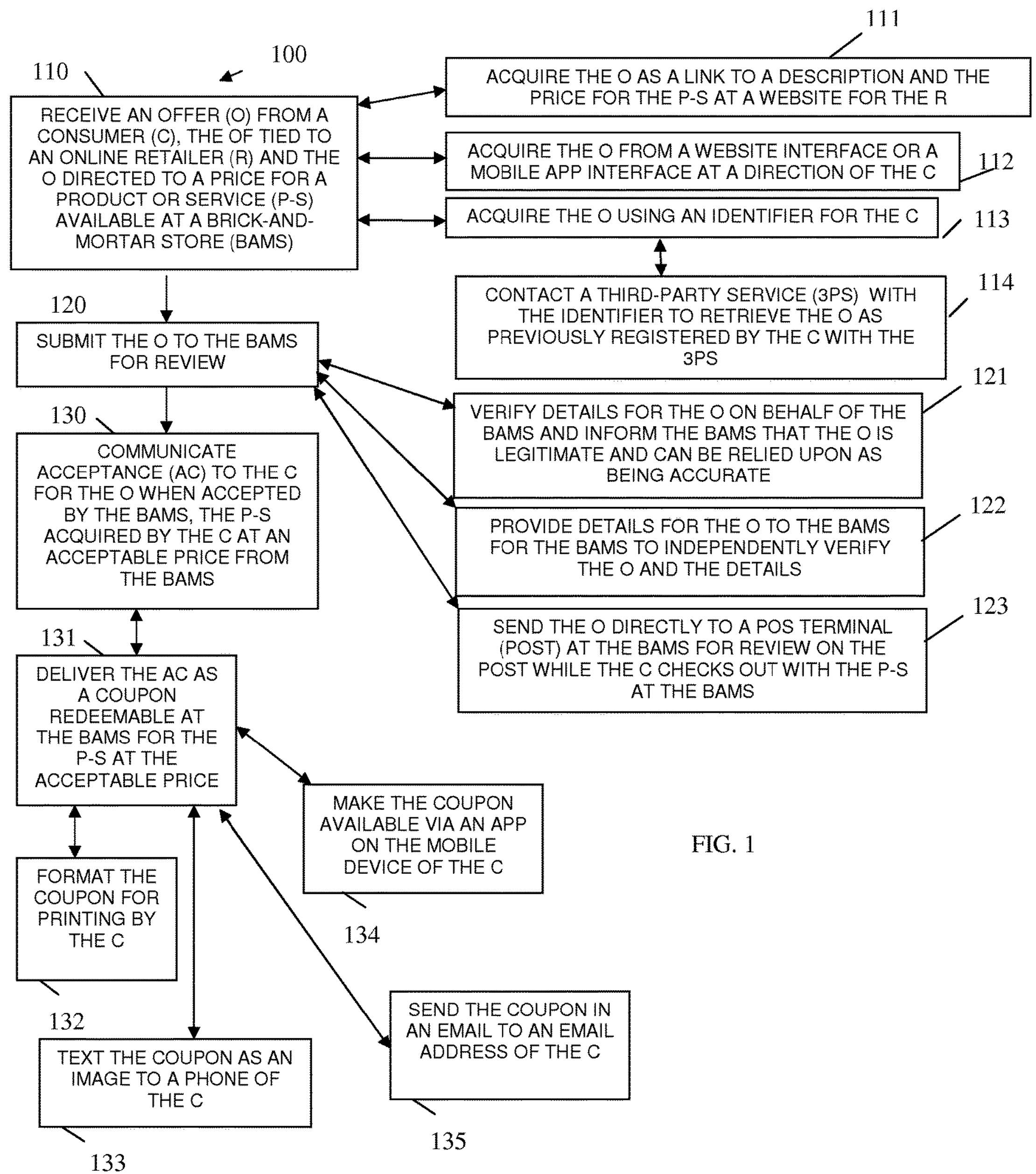
FIG. 1 is a diagram of a method for online price matching, according to an example embodiment.

FIG. 1 is a diagram of a method 100 for online price matching, according to an example embodiment. The method 100 (hereinafter "price negotiator") is implemented as instructions programmed and residing in memory and/or on a non-transitory computer-readable (processor-readable) storage medium and executed by one or more processors of a device. The processors are specifically configured and programmed to process the price negotiator. The price negotiator operates over a network. The network is wired, wireless, or a combination of wired and wireless.

A "device" as used herein includes any machine or composite machine (multiple devices or functions) having one or more processors, memory, and/or storage. The processors, memory, and/or storage cooperate to process executable instructions to provide services, such as the novel methods and mechanisms discussed herein and below.

At 110, the price negotiator receives an offer from a consumer. The offer is tied to an online retailer and the offer is directed to a price for a product or service available at a brick-and-mortar store. A brick-and-mortar store is a physical store that sells the goods (products) and/or services. Some brick-and-mortar stores may also have an online presence and be considered an online retailer. However, the online retailer from where the offer originates is different than the brick-and-mortar store deciding on whether to accept the offer (as discussed below). That is, the offer is made to the brick-and-mortar store to either accept or reject.

According to an embodiment, at 111, the price negotiator acquires the offer as a link to a description and the price for the product or service at a website for the online retailer. The link can be a uniform resource locator (URL) that provides a web page or Application Programming Interface (API) for the online retailer identifying the price and a description for the product or service.

In an embodiment, at 112, the price negotiator acquires the offer from a website interface or a mobile app interface at a direction of the consumer. So, the offer is provided in a website form or is provided via a mobile app processing on a mobile device, such as a phone, of the consumer.

In one situation, at 113, the price negotiator acquires the offer using an identifier for the consumer. That is, the offer is tied to the consumer via the identifier for the consumer.

Continuing with the embodiment of 113 and at 114, the price negotiator contacts a third-party service with the identifier to retrieve the offer as previously registered by the consumer with the third-party service. Another words, the consumer registers the offer (can be registered as an URL via website browser or via a mobile app) with a third-party service, which the price negotiator contacts with the consumer's identifier to retrieve the offer. This communication can occur dynamically and automatically when the consumer checks out, when the loyalty card of the consumer is swiped at a POS terminal.

At 120, the price negotiator submits the offer to the brick-and-mortar store for review. The submission can occur directly to systems of the brick-and-mortar store or indirectly through a third-party service.

According to an embodiment, at 121, the price negotiator verifies details for the offer on behalf of the brick-and-mortar store and informs the brick-and-mortar store that the offer is legitimate and can be relied upon as being accurate. That is, the price negotiator can be in an authenticated and trusted relationship with interfaces of the brick-and-mortar store (software interfaces) and provide an assertion that the offer has been checked out and verified by the price negotiator on behalf of the brick-and-mortar store. In an embodiment, the assertion can be provided in a Security Assertion Markup Language (SAML).

In an embodiment, at 122, the price negotiator provides details for the offer to the brick-and-mortar store to independently verify the offer and the details. These details can include an URL and/or such things as an identifier for the online retailer, an identifier for the product or service, the price, and other offer details such as shipping fees, taxes, quantity discounts and the like.

In one case, at 123, the price negotiator sends the offer directly to a POS terminal at the brick-and-mortar store for review on the POS terminal while the consumer checks out with the product or service at the brick-and-mortar store. In some cases, the price negotiator processes as a server or cloud service and the offer is sent to the POS terminal when an identifier for the consumer is entered (such as loyalty card). In another case, the price negotiator may process as an app on a consumer's mobile device (such as a phone), here the offer can be sent to the POS terminal via Near Field Communication (NFC), Bluetooth, Radio Frequency (RF), WiFi, and/or cellular communications.

At 130, the price negotiator communicates acceptance of the offer to the consumer when the offer is accepted by the brick-and-mortar store. The product or service acquired by the consumer at an acceptable price to the consumer from the brick-and-mortar store. It is noted that an acceptable price does not always have to be a lowest price because the online retailer may have shipping fees; moreover, the consumer may still accept a slightly higher price for the product or service from the brick-and-mortar store for the convenience of acquiring the good or service immediately (no delay such as what would be associated with ordering online from the online retailer). It is also noted that communications by the price negotiator with the brick-and-mortar store occurs via software interfaces in an automated manner or via a trusted software agent or service of the brick-and-mortar store.

According to an embodiment, at 131, the price negotiator delivers the acceptance as a coupon redeemable at the brick-and-mortar store for the product or service at a price acceptable to the consumer. What is considered acceptable is a price the consumer is willing to accept such that the product or service is purchased from the brick-and-mortar store.

In an embodiment, at 132, the price negotiator formats the coupon for printing by the consumer.

In another case, at 133, the price negotiator texts the coupon as an image to a phone of a consumer. The image may include a barcode or a Quick Response (QR) code that can be directly scanned from a screen of the phone.

In yet another situation, at 134, the price negotiator makes the coupon available via an app on the mobile device of the consumer. So, the coupon can be an image having a barcode or QR code and provided within the app. In other cases, the app can communicate the coupon to POS terminals for redemption at the brick-and-mortar store using Bluetooth, RF, NFC, WiFi, and/or cellular communications.

In one case, at 135, the price negotiator sends the coupon in an email to an email address of the consumer. The consumer may subsequently print the coupon or forward it to a mobile device for redemption.

In some situations, the coupon is not sent at all to the consumer or devices of the consumers; rather, the coupon or details for redeeming the coupon is credited to a loyalty account at the brick-and-mortar store, such that redemption occurs when the consumer is identified during a transaction where the product or service is being purchased at the brick-and-mortar store. So, the consumer need not actually possess the coupon in these situations.

Figure 2:
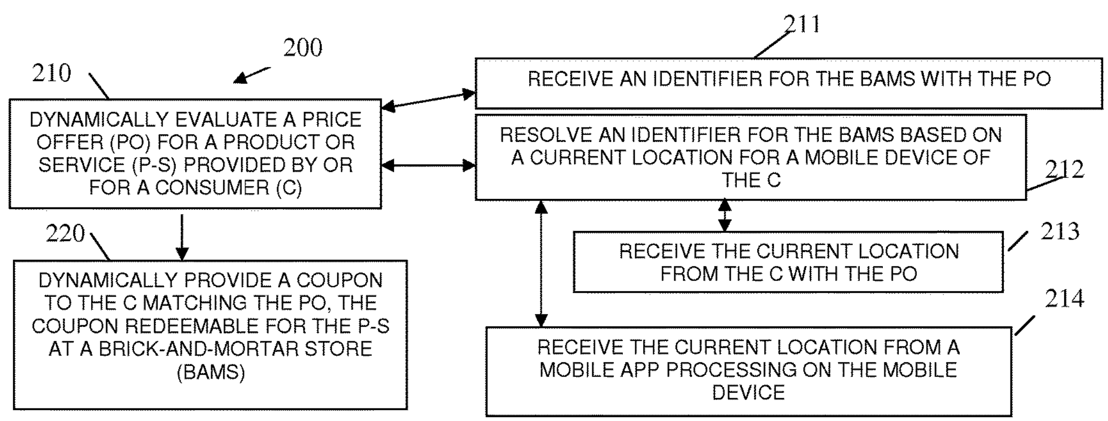
FIG. 2 is a diagram of another method for online price matching, according to an example embodiment.

FIG. 2 is a diagram of another method 200 for online price matching, according to an example embodiment. The method 200 (hereinafter "offer manager") is implemented as instruction and programmed within memory and/or a non-transitory computer-readable (processor-readable) storage medium that executes on one or more processors of a device; the processors of the device are specifically configured to execute the offer manager. The offer manager is also operational over a network; the network is wireless, wired, or a combination of wired and wireless.

The offer manager shows another and in some ways an enhanced perspective of the price negotiator, discussed in detail above with reference to the FIG. 1.

At 210, the offer manager dynamically evaluates a price offer for a product or service provided by or for a consumer. This dynamically evaluation can occur in an entirely automated fashion, such as when policies for deciding whether to match a price offer are defined in conditions and actions that can be automatically and dynamically evaluated without any human intervention. In other cases, the evaluation is automated by uses a manual human acceptance, such as a manager at a brick-and-mortar store that uses an interface of a POS terminal to accept or match the price offer.

According to an embodiment, at 211, the offer manager receives an identifier for the brick-and-mortar store with the price offer. That is, the price offer is tied to a specific brick-and-mortar store.

In an embodiment, at 212, the offer manager resolves an identifier for the brick-and-mortar store based on a current location for a mobile device (phone, tablet, etc.) of the consumer.

Continuing with the embodiment of 212 and at 213, the offer manager receives the current location from the consumer with the price offer. So, the consumer can indicate a specific store that the price offer is to be sent to for a determination as to whether it can be matched.

In another case of 212 and at 214, the offer manager receives the current location from a mobile app processing on the mobile device. Here, the mobile app determines an existing location of the consumer based on the resolved location for the mobile device and this is used to locate the brick-and-mortar store.

At 220, the offer manager dynamically provides a coupon to the consumer that matches the price offer. The coupon is redeemable for the product or service at a brick-and-mortar store (such as those identified specifically via the processing at 211-214). The manner in which the coupon is provided or associated with the consumer was discussed in detail above with reference to the FIG. 1. Also, it is again noted that what is meant by "match" means that the price provided in the coupon is one that is acceptable to the consumer. This does not necessarily mean that the coupon price is lower than the price offer (although it can be in some situations); rather this means that the coupon price is agreeable to the consumer.

It is noted that the coupon itself can be provided immediately and produced in a completely automated fashion. In other case, the coupon is provided in a semi-delayed fashion, such as when delivered via email. In yet other cases, the coupon may be implicitly supplied or negotiated in real time at a POS terminal, such as when a manage is reviewing the price offer with the consumer during a checkout at the brick-and-mortar store.

Figure 3:
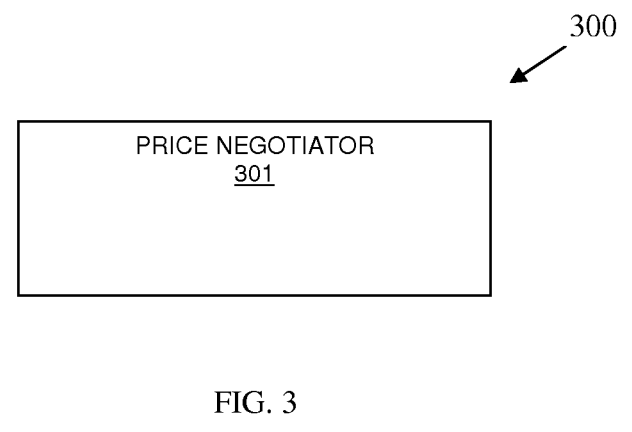

FIG. 3 is a diagram of an online price matching system 300, according to an example embodiment. The components of the online price matching system 300 are implemented as executable instructions and programmed within memory and/or a non-transitory computer-readable (processor-readable) storage medium that execute on one or more processors of a device; the processors are specifically configured to execute the components of the online price matching system 300. The online price matching system 300 is also operational over a network; the network is wired, wireless, or a combination of wired and wireless.

The online price matching system 300 includes a price negotiator 301.

The online price matching system 300 includes one or more processors of a network device. The device has memory configured with the price negotiator 301; the price negotiator 301 executes on the one or more processors. Example processing associated with the price negotiator 301 was presented in detail above with reference to the methods 100 and 200 of the FIGS. 1 and 2, respectively.

The price negotiator 301 is configured to receive and evaluate price offers for a product or service for a specific brick-and-mortar store and when acceptable matches the price offers by providing a coupon for redemption at the brick-and-mortar store by a consumer.

According to an embodiment, the price negotiator 301 operates as a service of the brick-and-mortar store.

In another case, the price negotiator 301 operates as a cloud service on behalf of the brick-and-mortar store and additional brick-and-mortar stores.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method for price matching between unaffiliated stores, the method implemented as executable instructions within a non-transitory computer-readable storage medium of a hardware device that executes the executable instructions, the method comprising:

receiving, by the executable instructions executing on the hardware device, an offer from a consumer for a product or service from a third-party online store, the offer communicated from a mobile device operated by the consumer in wireless communication with the executable instructions and wherein the offer includes a price for the product or service at the third-party online store and the product or service is available at a brick-and-mortar store and wherein the brick-and-mortar store is unaffiliated with the third-party online store;

submitting, by the executable instructions over a network, the offer to a point-of-sale terminal at the brick-and-mortar store for review, wherein submitting further includes automatically submitting the offer to the point-of-sale terminal through automated software interfaces over the network and providing, through the automated software interfaces, an assertion to the point-of sale terminal with the offer indicating that the executable instructions has verified details of the offer on behalf of the brick-and-mortar store based on an authenticated and trusted relationship between software interfaces, with the executable instructions and the point-of-sale terminal, allowing the point-of-sale terminal to rely on the offer being legitimate when submitted by the executable instructions to the point-of-sale terminal; and providing, by the executable instructions, a notice to the consumer that the offer has been accepted by the brick-and-mortar store to make the product or service available to the consumer at an acceptable price from the brick-and-mortar store, wherein providing the notice comprises sending the notice to the mobile device and the point-of-sale terminal for purposes of providing a price match of the offer from the third-party online store by the brick-and-mortar store at the point-of-sale terminal to the consumer.

2. The method of claim 1, wherein receiving further includes acquiring the offer as a link to a description and the price for the product or service at a website for the online retailer.

3. The method of claim 1, wherein receiving further includes acquiring the offer from a website interface or a mobile app interface at a direction of the consumer.

4. The method of claim 1, wherein receiving further includes acquiring the offer using an identifier for the consumer.

5. The method of claim 4, wherein acquiring further includes contacting a third-party service with the identifier to retrieve the offer as previously registered by the consumer with the third-party service.

6. The method of claim 1, wherein submitting further includes providing the details for the offer to the brick-and-mortar store for the brick-and-mortar store to independently verify the offer and the details.

7. The method of claim 1, wherein communicating further includes delivering the acceptance as a coupon redeemable at the brick-and-mortar store for the product or the service at or below the price.

8. The method of claim 7, wherein delivering further includes formatting the coupon for printing by the consumer.

9. The method of claim 7, wherein delivering further includes texting the coupon as an image to the mobile device.

10. The method of claim 7, wherein delivering further includes making the coupon available via an app on the mobile device.

11. The method of claim 7, wherein delivering further includes sending the coupon in an email to an email address of the consumer.

12. The method of claim 1, wherein the offer is received from the mobile device in the form of a hyperlink.

13. A system for price matching between unaffiliated stores, comprising:

a non-transitory memory configured with a price negotiator that processes as executable instructions on one or more hardware processors of one or more hardware devices of a network;

wherein the price negotiator is configured to wirelessly receive price offers from a mobile device and automatically evaluates the prices of and verifies legitimacy of offers for a product or service on behalf of a specific brick-and-mortar store through software interfaces between the price negotiator and the specific brick-and-mortar store when the offers are provided by the price negotiator to a point-of-sale terminal of the specific brick-and-mortar store, wherein the software interfaces are in an authenticated and trusted relationship with one another and, when acceptable, matches the price offers by providing a coupon through automated software interfaces over the network or a wireless network, to the point-of-sale terminal at the brick-and-mortar store and the mobile device, for redemption at the brick-and-mortar store by a consumer for purposes of providing a price match of the price offers from the brick-and-mortar store at the point-of-sale terminal to the consumer, and wherein the price offers originate from one more stores that are unaffiliated with the brick-and-mortar store.

14. The system of claim 13, wherein the price negotiator operates as a service of the brick-and-mortar store.

15. The system of claim 13, wherein the price negotiator operates as a cloud service on behalf of the brick-and-mortar store and additional brick-and-mortar stores.

16. A method for price matching between unaffiliated stores, the method implemented as executable instructions within a non-transitory computer-readable storage medium of a hardware point-of-sale terminal that executes the executable instructions, the method comprising:

receiving, by a point-of-sale terminal at a brick-and-mortar store, an offer from a consumer for a product or service from a third-party online store, wherein the offer describes a price for the product or service at the third-party online store and the product or service is available at the brick-and-mortar store, and wherein the brick-and-mortar store is unaffiliated with the third-party online store, wherein receiving further includes receiving the offer wirelessly from the mobile device operated by the consumer;

automatically accessing a web page of the third-party online store, on behalf of the brick-and-mortar store, to determine whether the offer is legitimate, wherein the web page provided with the offer in the receiving;

determining, by the point-of-sale terminal, whether details of the offer are acceptable at the brick-and-mortar store by receiving an assertion through software interfaces between the point-of-sale terminal and the brick-and-mortar store based on an authenticated and trusted relationship maintained with the software interface and the point-of-sale terminal, allowing the point-of-sale terminal to rely on the offer being legitimate; and providing a notice to the mobile device that the offer has been accepted by the brick-and-mortar store and making, by the point-of-sale terminal, the product or service available to the consumer at an acceptable price from the brick-and-mortar store defined by the offer and thereby providing a price match of the offer from the brick-and-mortar store at the point-of-sale terminal to the consumer.

17. The method of claim 16 wherein determining, through use of the point-of-sale terminal, whether the offer is acceptable at the brick-and-mortar store comprises automatically determining, through use of the point-of-sale terminal, whether the offer is acceptable at the brick-and-mortar store.

* * * * *